United States Patent

Carter, Jr. et al.

[11] Patent Number: 5,997,250
[45] Date of Patent: Dec. 7, 1999

[54] METHOD AND APPARATUS FOR CONTROLLING PITCH OF AN AIRCRAFT PROPELLER

[75] Inventors: Jay Carter, Jr., Burkburnett; Adrian P. K. Nye, Wichita Falls, both of Tex.

[73] Assignee: Catercopters, LLC, Wichita Falls, Tex.

[21] Appl. No.: 09/004,500

[22] Filed: Jan. 8, 1998

Related U.S. Application Data

[60] Provisional application No. 60/035,033, Jan. 9, 1997.

[51] Int. Cl.[6] .............................. B64C 11/30; B63H 3/00; B63H 3/02
[52] U.S. Cl. .................................. 416/27; 416/1; 416/35; 416/36; 416/37; 416/38; 416/27; 416/28; 416/30; 416/42; 416/39; 416/40; 416/44; 416/47
[58] Field of Search ................................. 416/1, 35, 36, 416/37, 38, 27, 28, 30, 42, 39, 40, 44, 47

[56] References Cited

U.S. PATENT DOCUMENTS

| | | |
|---|---|---|
| 1,972,669 | 9/1934 | Soucek . |
| 2,307,040 | 1/1943 | Hammond, Jr. . |
| 2,737,252 | 3/1956 | Knapp et al. . |
| 2,840,170 | 6/1958 | Best ......................................... 416/47 |
| 3,001,588 | 9/1961 | Fischer ..................................... 416/35 |
| 5,209,640 | 5/1993 | Moriya . |
| 5,284,418 | 2/1994 | Moriya ..................................... 416/35 |
| 5,299,911 | 4/1994 | Moriya . |

*Primary Examiner*—F. Daniel Lopez
*Assistant Examiner*—Rhonda Barton
*Attorney, Agent, or Firm*—James E. Bradley

[57] ABSTRACT

A propeller pitch control apparatus for an aircraft in which the vector sum of the aircraft forward speed and the propeller rotational tip speed is a selected fraction of the speed of sound, the fraction based on percent power and altitude, to maximize efficiency and minimize noise.

30 Claims, 14 Drawing Sheets

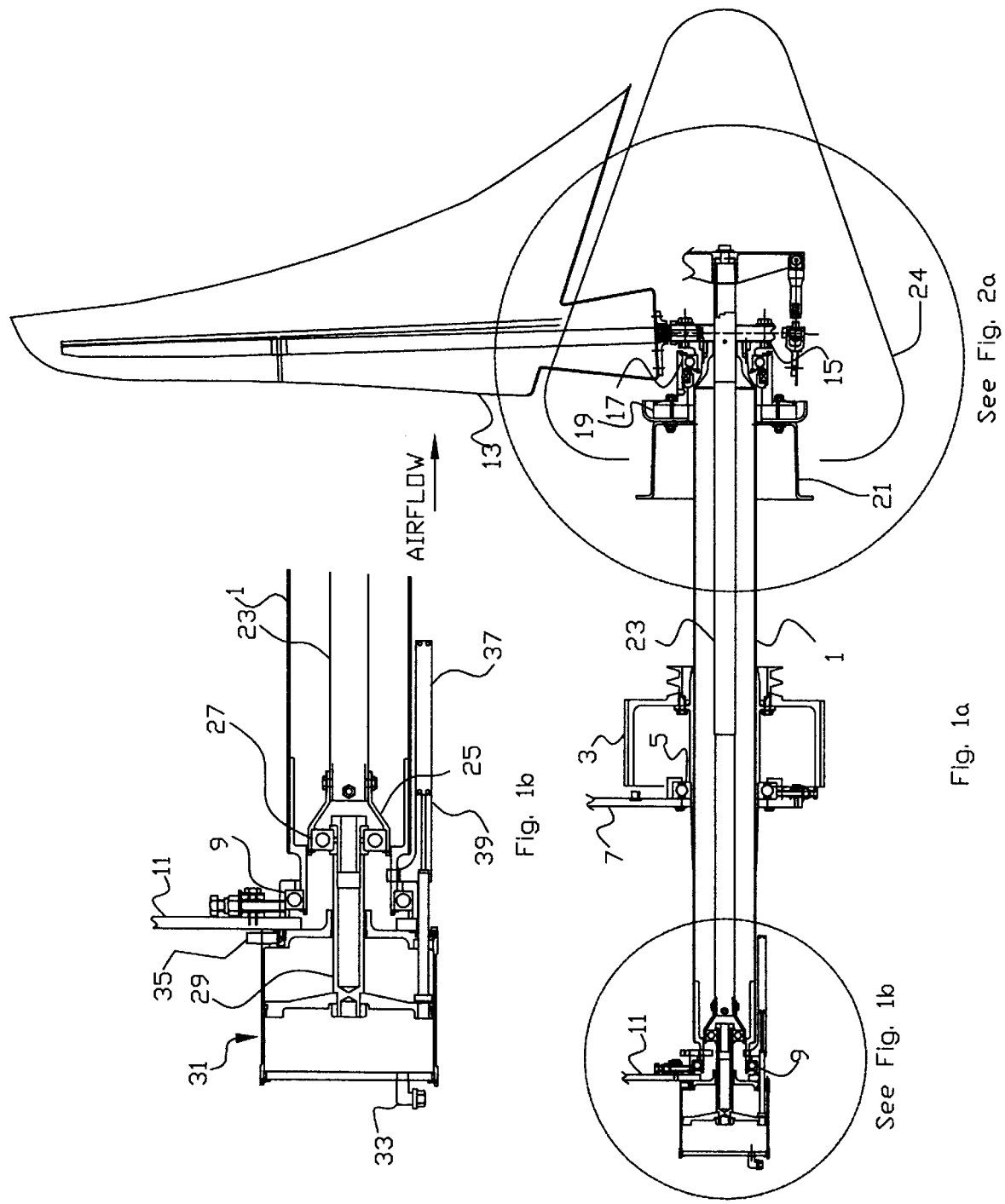

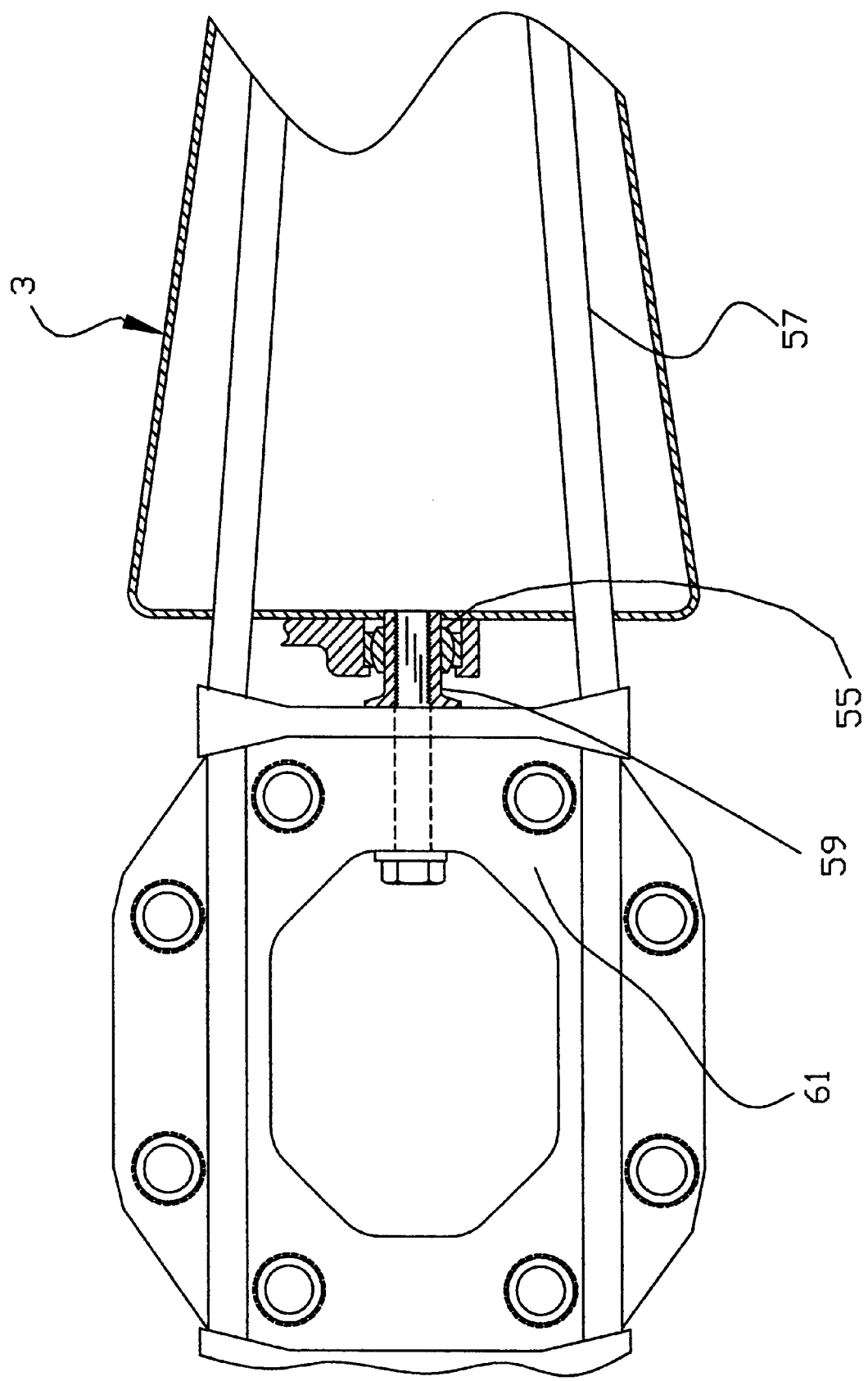

Subroutine CD
Calculate Desired RPM
Using Vector Match
Number Algorithm

Subroutine TS
Calculate Propeller
Rotational Tip Speed

Subroutine AD
Calculate Air Density

Subroutine DR
Calculate Desired
Propeller RPM

METHOD AND APPARATUS FOR CONTROLLING PITCH OF AN AIRCRAFT PROPELLER

This application claims the benefit of U.S. Provisional Patent Application Ser. No. 60/035,033; filed 9 Jan. 1997, entitled Variable Pitch Propeller Controller.

TECHNICAL FIELD

The present invention relates in general to propeller systems for aircraft, and in particular to systems for controlling the pitch of aircraft propellers.

BACKGROUND ART

As aircraft become an increasingly more important mode of transportation, efforts continue to increase the efficiency, safety, and comfort of air travel. In propeller driven aircraft, the propulsion system, and especially the propellers, are under constant engineering scrutiny in order to continuously improve efficiency and safety, while reducing vibration and noise associated with the propulsion system.

Various altitude-compensating propeller pitch controls and constant-speed propeller pitch controls have been known since the 1930's. The constant speed propeller, in which the pilot manually selects the desired rotation rate and the pitch control mechanism controls the blade pitch to maintain that rotation rate, is still the standard on high-performance private and small commercial aircraft.

U.S. Pat. No. 5,209,640 discloses a computer-controlled pitch controller in which flight speed, atmospheric pressure, atmospheric temperature, and throttle setting are considered to calculate an optimum rotation rate for propeller efficiency.

At high power output, aircraft propeller tips frequently approach the speed of sound, causing loss of efficiency and high noise due to compressibility effects. Noise in particular is a major problem during takeoff because of the noise sensitivity of communities near airports.

DISCLOSURE OF INVENTION

The primary object of the invention is to provide a propeller pitch control wherein the pitch angle is controlled to maximize the product of engine efficiency and propeller efficiency, while limiting acoustic noise, by controlling the ratio of the vector sum of aircraft forward speed and propeller rotational tip speed to the speed of sound.

A further primary object is a pitch controller which can function effectively with many different sets of sensors, providing implementation flexibility and increasing reliability.

The primary objects are attained by a propeller pitch mechanism comprising an engine or propeller rotation rate sensor producing a first electrical signal, a fuel flow or engine output torque sensor producing a second electrical signal which in combination with the first electrical signal is indicative of engine output power, an aircraft forward speed sensor producing a third electrical signal, and optional further sensors producing electrical signals carrying environmental data necessary to calculate the speed of sound and to calculate the true aircraft forward speed, all the above electrical signals providing input to a data processor which calculates an optimum propeller rotation rate, and controls a propeller blade pitch control servo to attain substantially the calculated optimum propeller rotation rate.

BRIEF DESCRIPTION OF DRAWINGS

The novel features believed characteristic of the invention are set forth in the appended claims. The invention itself however, as well as a preferred mode of use, further objectives and advantages thereof, will best be understood by reference to the following detailed description of the preferred embodiment when read in conjunction with the accompanying drawings, wherein:

FIG. 1a shows a side view of the propeller drive shaft with a pitch control hydraulic cylinder and linkages.

FIG. 1b shows an enlarged side view of the pitch control hydraulic cylinder.

FIG. 2c is a sectional view of a propeller spar of FIG. 2a taken along the lines 2c—2c.

BEST MODE FOR CARRYING OUT INVENTION

Figure 2A:
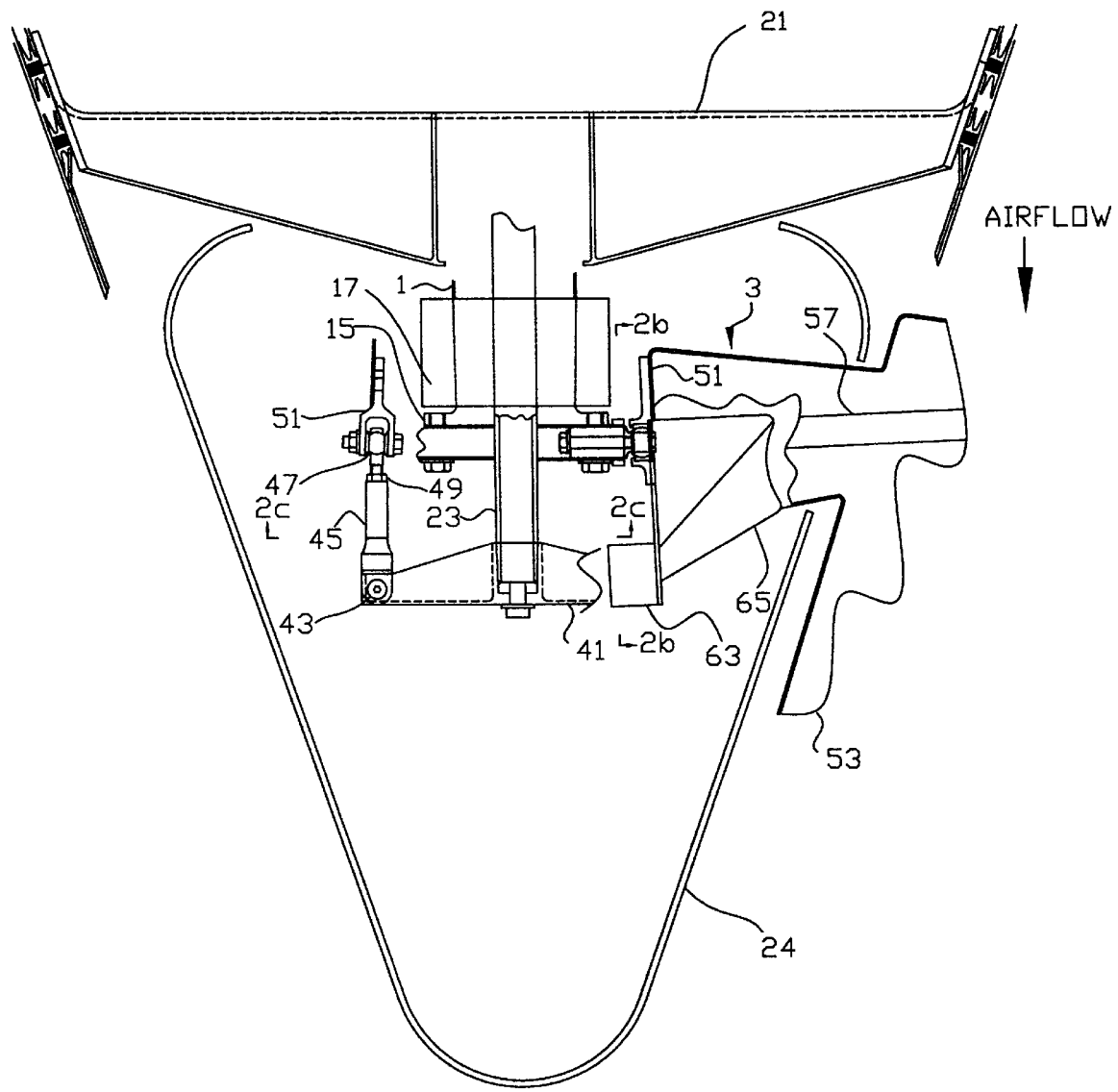
FIG. 2a is a top view of the propeller pitch control linkage.

Referring to FIG. 1a we see a drive shaft and pitch control system for a pusher propeller, wherein the propeller is mounted to the rear of an aircraft. Drive shaft 1 is driven by an engine (not shown) through a sprocket 3. Drive shaft 1 rides on a main bearing 5 mounted on main support 7 and a front bearing 9 mounted on front support 11. A propeller 13 (described in the co-pending application entitled Variable Pitch Aircraft Propeller, identified by Attorney Docket No. 0992RF-010, which is incorporated by reference herein) is mounted to a propeller flange 15. Thrust forces are borne by thrust bearing 17, which is resiliently mounted by rubber mounts 19 to propeller support beam 21, which is mounted to the fuselage (not shown). A pitch rod 23 passes through the center of propeller 13, through flange 15, and through the center of drive shaft 1. Spinner 24 encloses and streamlines the pitch control apparatus.

FIG. 1b is a detail of the pitch control cylinder assembly and front propeller shaft support. Pitch rod 23 is attached to a connector 25 and then to the outer race of a ball bearing 27. The inner race of bearing 27 connects a pushrod 29 to a hydraulic cylinder 31, which pushes and pulls pushrod 29 and pitch rod 23 according to fluid pressure at pressure fittings 33 and 35. Bearing 27 allows pushrod 29 to move in and out without rotating, while pitch rod 23 rotates with drive shaft 1. Bearing 9 and front support 11 supports the end of drive shaft 1 near hydraulic cylinder 31. A linear potentiometer 37, supported by bracket 39, senses the position of pitch rod 23 for feedback to the pitch controller.

FIG. 2*a* is a top view of the propeller and pitch linkages. Cross beam 41 is attached on the end of pitch rod 23. Each end of cross beam 41 is connected by a shoulder bolt pivot 43 to a pitch link 45 which is a rigid rod with a spherical bearing rod end 47 threaded into its other end. The threads of rod end 47 allow for length adjustment, and a lock nut 49 eliminates play in the threads and prevents accidental adjustment when the linkage is disconnected. The spherical bearing of each pitch link 45 is connected to a pitch horn 51 which is bolted to a propeller cuff 3.

Figure 2B:
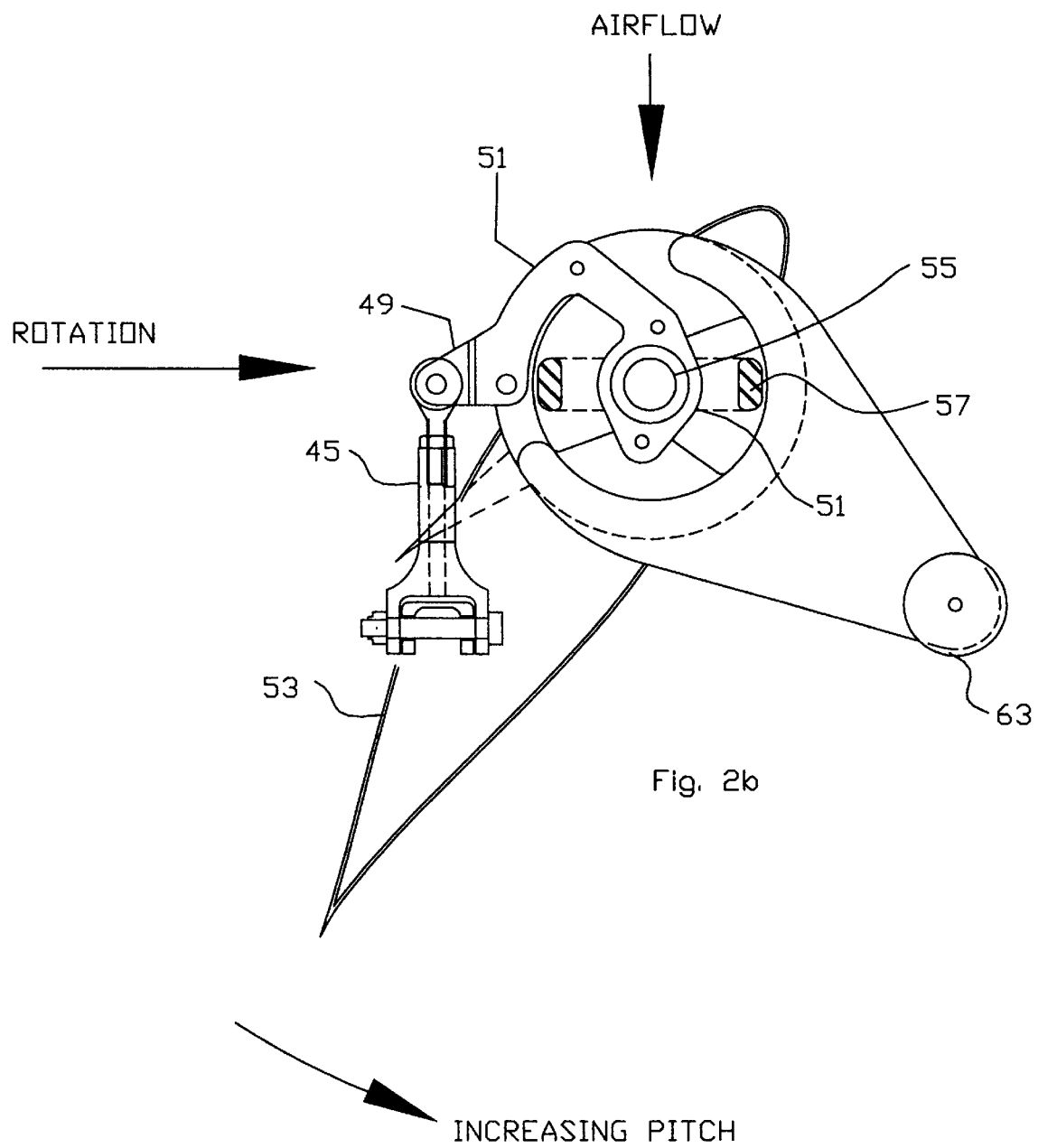
FIG. 2b is a sectional view of a propeller hub of FIG. 2a taken along the lines 2b—2b.

As best illustrated in FIG. 2*b*, when pitch rod 23 (FIG. 2*a*) extends outward from propeller flange 15, cross beam 41 and pitch links 45 turn propeller blades 53 toward an increased pitch. When pitch rod 23 retracts toward propeller flange 15, cross beam 41 and pitch links 45 turn propeller blades 53 toward a reduced pitch. FIG. 2*b* also shows pitch horn 51, which is bolted to blade 53 at four positions. Pitch horn 51 pivots around spherical bearing 55. Clevis 49 connects to pitch link 45.

FIG. 2*c* shows a front view of the propeller hub, showing a detail of the spherical bearing 55 on which propeller cuff 3 rotates around propeller spar 57. Spherical bearing 55 is allowed to slide on pin 59, which is bolted to propeller root block 61.

Counterweight 63 and counterweight arm 65 decrease the forces necessary to control the propeller pitch, and also remove the play or deadband from the linkages. Co-pending application identified by attorney's docket number 0992RF-010, entitled Variable Pitch Aircraft Propeller, included herein by reference, describes the type of propeller to be used with the preferred embodiment and the method used to select the amount of weight and the length of the arm. In brief, propellers tend to move to flat pitch when in use due to the tendency of all rotated masses to move toward the plane of rotation. Without a counterweight, this force attempting to pitch the propeller toward flat pitch would tend to remove the deadband in the control system by placing tension on pitch links 45 and compression on pitch rod 23, but it would lead to high control pressures in cylinder 31 at high rotation rates. A relatively small counterweight would maintain the direction but decrease the magnitude of the loads in pitch links 45 and pitch rod 23 and the pressure in cylinder 31. With a somewhat greater counterweight (or a longer counterweight arm), the direction of the loads can actually be reversed (compression on pitch links 45 and tension on pitch rod 23) while keeping the magnitude of the loads low. The choice of which of these approaches to use generally involves the desired behavior upon engine failure or pitch control system failure, and there are arguments in favor of either approach.

With the lighter counterweight approach, the propeller pulls itself to low pitch when the pitch control system fails. Low pitch provides the highest thrust near the ground, and thus provides the most safety when near the ground. However, at high altitudes, low pitch might cause the engine and propeller to overspeed, even if the engine was shut down. Furthermore, flat pitch would cause high drag and reduce gliding range.

With the heavier counterweight approach, the propeller pulls itself to high pitch when the pitch control system fails. High pitch is a cruise position, so going to high pitch after a pitch control failure allows continued efficient cruise flight, and reduces the possibility of an engine overspeed at high altitude. High pitch is not ideal for maximum power near the ground, but sufficient power is still available to land or maintain level flight near the ground. The greater counterweight approach has the disadvantage that it applies higher loads in the propeller cuff 3 and counterweight arm 65.

In either approach, if the engine fails but the pitch controller is still operational, the propeller will most likely keep rotating because of the airflow through the propeller, and so the pitch controller will sense low horsepower and select a higher pitch to slow the propeller down, thereby reducing drag and increasing gliding range.

Also with either approach, if the propeller does stop rotating after an engine failure, engine oil pressure is no longer available, so the propeller would slowly weathervane or at lower speeds would slowly approach the pitch corresponding to the relaxed position of propeller spar 57, which is moderate pitch. Moderate pitch is a reasonably low drag position.

Figure 3:
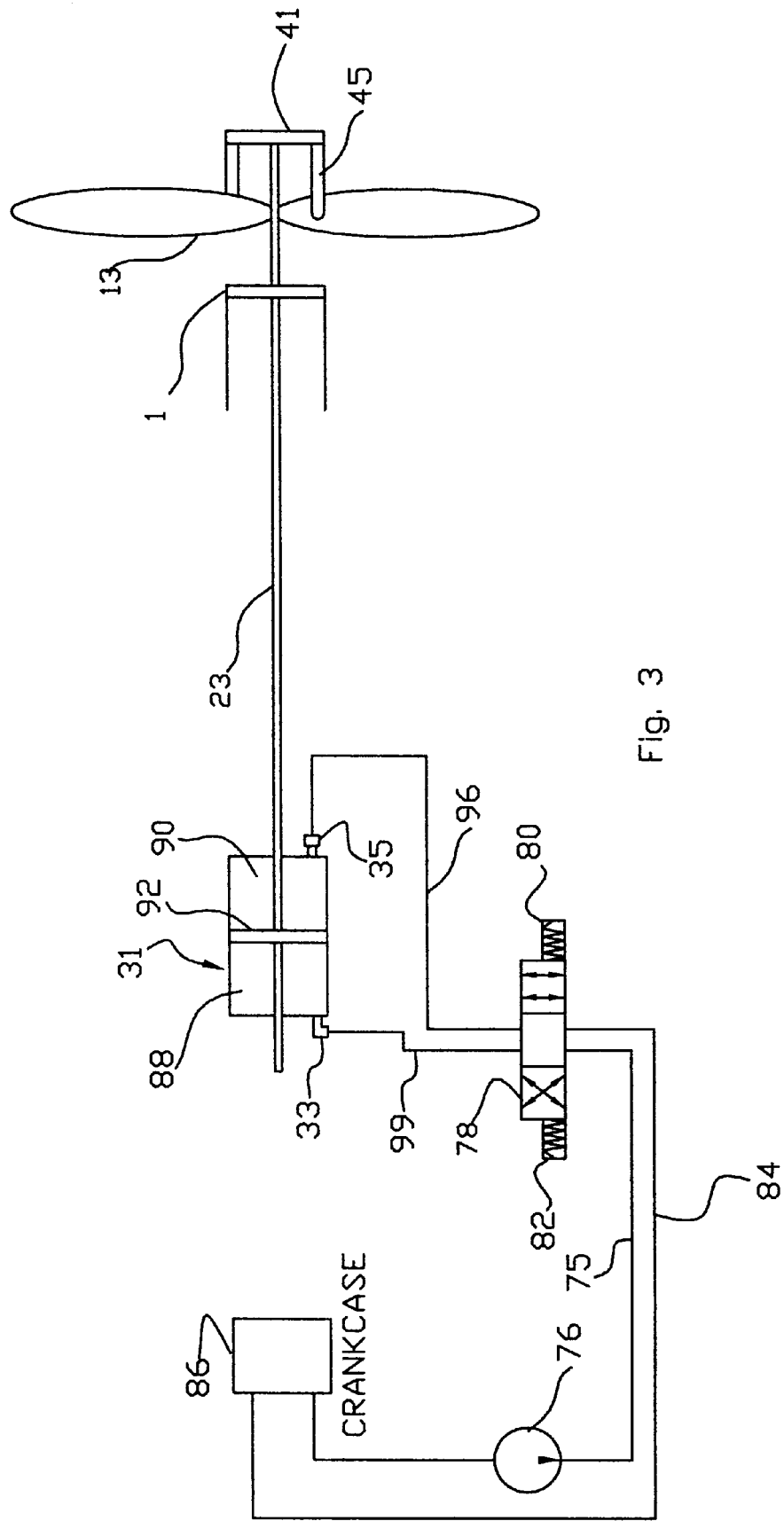
FIG. 3 is a schematic of the hydraulic control system for the propeller pitch control.

FIG. 3 shows a schematic of the hydraulic system for the propeller pitch control. Fluid pressure at hydraulic line 75 is provided by engine oil pump 76 and is controlled by a solenoid valve 78 controlled by two electrically operated solenoids 80 and 82. Hydraulic line 84 connects solenoid valve 78 to the engine crankcase 86 which acts as a hydraulic fluid reservoir. Hydraulic cylinder 31 is separated into volumes 88 and 90 by piston 92. Volume 90 in hydraulic cylinder 31 is connected through fitting 35 then through hydraulic line 96 to the solenoid valve 78. Volume 88 in hydraulic cylinder 31 is connected through fitting 33 to hydraulic line 99 and to the solenoid valve 78. When both solenoids are deactivated, piston 92 remains fixed (except for any leakage by solenoid valve 78 due to pressure on one side). To move the piston to the left and decrease pitch, solenoid 82 is activated to connect line 96 to line 75 and line 99 to line 84. To move the piston to the right and increase pitch, solenoid 80 is activated, connecting line 99 to line 75 and connecting line 96 to line 84.

Figure 4:
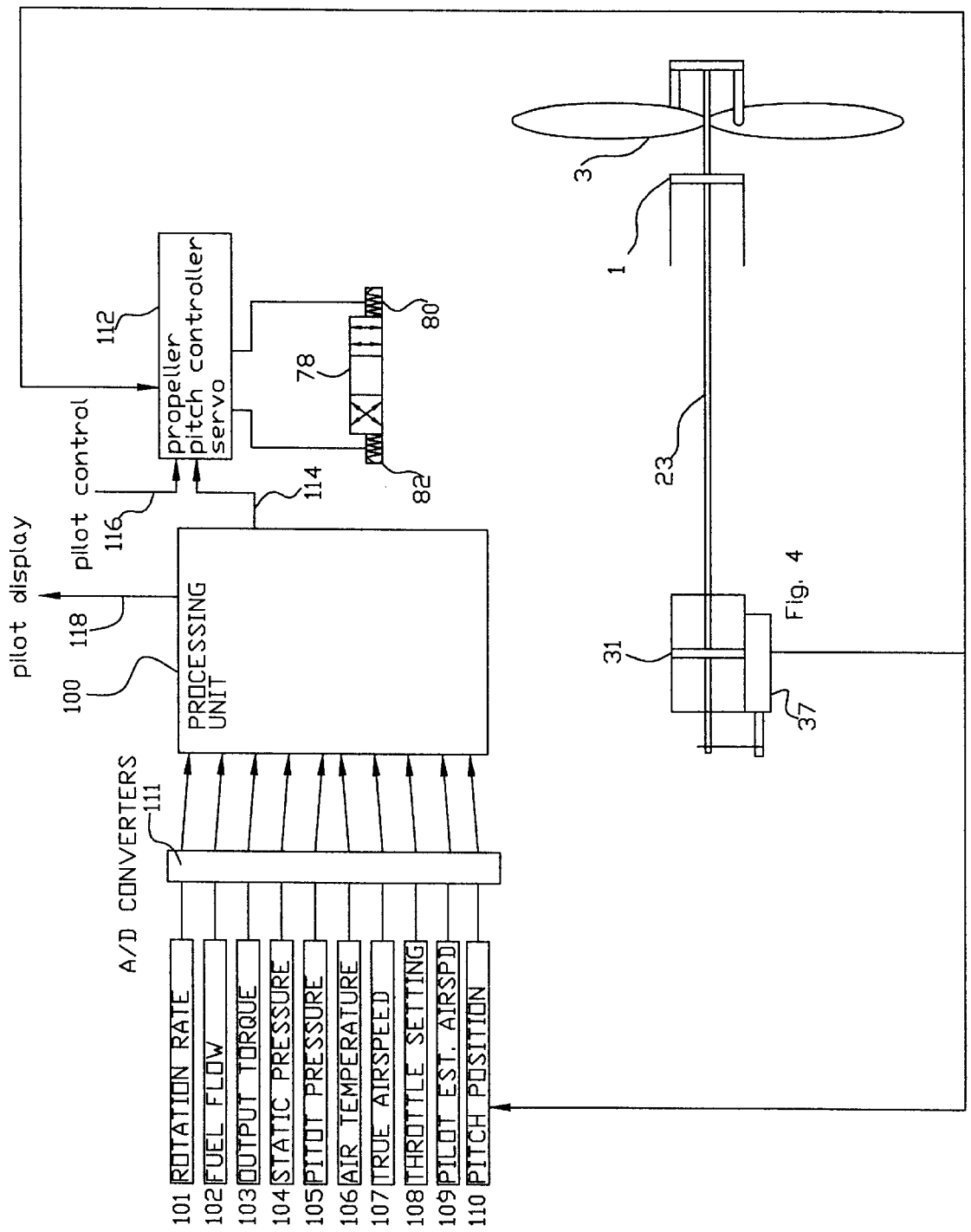
FIG. 4 is a schematic of the electrical controls for the hydraulic cylinder servo.

As shown in FIG. 4, general purpose processor 100, such as a microprocessor with support circuitry, is connected to various sensors 101–110 necessary to provide data on current environmental conditions and operational status. Each sensor is connected to an analog-to-digital converter 111 to provide data in a form usable by processor 100. Processor 100 is programmed to check the validity of values received from all sensors, and if any sensors fail, to notify the pilot and to substitute alternate sensor sets if possible or constant values where reasonable. Processor 100 is programmed to prioritize the working sensors according to the designer's view about which should be the most accurate. The pitch controller is designed to allow continued flight even after a total failure of processor 100, using manual control by the pilot.

A propeller pitch control servo 112 receives a desired position signal from processor 100 (connection 114), or from the pilot (connection 116) in the event the pilot wishes to override the processor. Sensor 110 through potentiometer 37 senses the position of pitch rod 23 and supplies a signal to processor 100 and controller 112. Servo 112 turns on solenoids 80 or 82 to actuate the hydraulic cylinder 31, thus moving pitch rod 23 to the position matching the desired position signal. The potentiometer signal is sent to processor 100 so that processor 100 can use the current pitch position in its calculations and can detect a failure of pitch control servo 112 and report the failure to the pilot.

Sensor 101 detects engine rotation rate or propeller rotation rate. In direct-drive propeller configurations the engine rotation rate and propeller rotation rate are the same. However, many aircraft use gear reduction units or belt reduction units to allow the engine to rotate at a fixed multiple of the propeller rotation rate, since efficient engine rotation rates for some engines are higher than efficient propeller rotation rates. Because these units use a fixed ratio of engine to propeller rotation rate, there is no need to sense both engine rotation rate and propeller rotation rate. Either rotation rate, together with the fixed radius of the propeller, is sufficient to calculate the propeller tip speed.

Sensor 102 detects fuel flow and sensor 103 detects engine output torque. Torque when combined with rotation rate is sufficient to calculate an accurate engine output power. Fuel flow provides an approximate indication of horsepower output. Either of these options may be used alone or both may be used.

Engine output power is more useful to know than the pilot's throttle setting because the engine for various reasons does not always generate the same power when the pilot's throttle control is at a certain position. Power declines at some altitude even for turbocharged engines because of decreased air density, and engine malfunctions may occur. However, a throttle setting sensor 108 is a useful backup in case any of the sensors necessary for calculating output power malfunction. If a throttle setting sensor is used, it is considered an indication of the desired percentage of the maximum available power given the current conditions, not a direct indication of output power.

Additional sensors are needed to measure true forward flight speed, and to calculate the speed of sound in the current conditions. These two values are needed in order to be able to calculate the fraction of the speed of sound represented by the true speed through the air of the propeller tip, since this fraction governs compressibility drag and associated noise.

In addition to rotation rate sensor 101, fuel flow sensor 102, and engine output torque sensor 103, the preferred embodiment includes static pressure sensor 104, pitot tube pressure 105, and air temperature sensor 106, true airspeed sensor 107, throttle setting sensor 108, pilot estimated true airspeed knob 109, and pitch position sensor 110. Not all of these sensors are required, since several combinations of sensors are sufficient to calculate true forward flight speed, the speed of sound, and engine output power. However, the additional sensors allow the pitch controller to continue functioning effectively even after the failure of one or more sensors.

Aircraft forward speed is normally measured using the difference between static air pressure (sensor 104) and pitot tube ram air pressure (sensor 105). The difference in pressure output of these devices is used to calculate a value called indicated airspeed. True forward flight speed, on the other hand, is the actual speed of the aircraft relative to the air, which is indicated airspeed corrected for air density, using the formula:

$$Vt = Vi \times SQRT(rho_{sea\ level}/rho) \quad (1)$$

where:

Vt is true airspeed

Vi is indicated airspeed $rho_{sea\ level}$ is air density at sea level rho is air density at the current altitude Air density is not easily sensed directly, but it can be calculated from static air pressure and temperature using the formula:

$$rho = P/RgT \quad (2)$$

where:

rho is air density

P is static atmospheric pressure

R is the gas constant of air, 53.331 ft/F° g is the gravitational constant, 32.174 ft/sec²

T is the absolute temperature.

Thus, the preferred minimum combination of sensors is:
1. Pitot tube air pressure
2. Static air pressure
3. Air temperature
4. Rotation rate
5. Engine torque In case of an inoperative temperature sensor, true airspeed can be calculated from indicated airspeed (based on static and pitot tube pressure), altitude (based on static pressure), and density (rho), where density is approximated within 3 percent between sea level and 50,000 feet with the formula:

$$rho = rho_{sea\ level} \times (1-(altitude/81,000))^2 \quad (3)$$

where:

rho is air density at the current altitude $rho_{sea\ level}$ is the air density at sea level altitude is calculated from static air pressure The speed of sound in air (a) is a function only of temperature. The function is:

$$a = 49\ SQRT\ (R°) = 49\ SQRT\ (F°+459) \quad (4)$$

where:

R° represents degrees Rankine.

F° represents degrees Fahrenheit.

Since the preferred minimum set of sensors listed above includes a temperature sensor, the speed of sound can be calculated without additional sensors. In case of an inoperative temperature sensor, the speed of sound can also be looked up in a table based on pressure altitude; this practice assumes standard temperature.

In case of inoperative temperature and static pressure sensors, use of a constant sea level value for the speed of sound of 1116 feet per second, or a constant average value for the aircraft's flight envelope, has reasonable accuracy and simplifies calculations. A constant value would be especially appropriate for an aircraft having a flight envelope that does not include a large range of altitudes.

If the static pressure or pitot tube pressure sensors are inoperative, indicated airspeed and therefore true airspeed cannot be calculated. A pilot controlled estimated true airspeed knob (sensor 109) allows the pilot to provide this information based on experience or navigational systems. If the rotation rate sensor 101 is functional, propeller pitch is set to result in an RPM calculated based on the vector sum of the current RPM and the pilot's estimated true airspeed such that the ratio of that vector sum to the speed of sound is approximately 0.8 at full throttle. If the rotation rate sensor 101 is invalid but the pitch position sensor 110 is functional, processor 100 sets the pitch based on the estimated forward true airspeed, the pitch selected to result in a 4 degree angle of attack at the propeller blade ¾ radius (calculated using the vector sum of forward true airspeed and propeller rotational tip speed), based on an assumed rotation rate of approximately 1750 RPM (for a 93 inch diameter propeller).

If no combination of sensors is available to supply airspeed and the pilot has chosen not to input a true airspeed value (by setting the knob to zero), and the rotation rate sensor is working, the pitch controller is programmed to maintain a constant RPM. The RPM chosen may vary from aircraft to aircraft. For slow aircraft, a setting near the maximum allowable RPM would be ideal since this setting provides maximum thrust near the ground, where maximum thrust matters most, and it also protects against engine overspeed. For faster aircraft, the chosen RPM needs to be lower than maximum RPM to prevent the propeller vector tip speed from nearing the speed of sound. In the preferred embodiment (for a very fast aircraft), the chosen rotation rate is 1750 RPM, while the maximum RPM is approximately 2300 RPM.

If the rotation rate and forward velocity sensors are invalid and the pilot has chosen not to set the estimated true airspeed knob, the processor 100 sets the pitch to about 34 degrees at the ¾ radius, which is a moderate pitch setting. This setting provides adequate thrust near the ground yet prevents engine overspeed at high airspeeds and altitudes.

An alternative set of sensors could supplement the pitot tube sensor 105 and static pressure sensor 104 with a direct true airspeed sensor 107. A direct true airspeed sensor might consist of a small, specially designed propeller driven by the airstream, turning a transducer producing electrical pulses at a rate indicative of true airspeed. The advantages of a true airspeed sensor include high accuracy and elimination of calculations otherwise needed to convert indicated airspeed to true airspeed. A disadvantage of the true airspeed sensor is that it is more difficult to keep free of ice than the pitot tube which can be heated. Also, the pilot needs some indication of angle of attack to predict aerodynamic conditions such as stall, and indicated airspeed based on pitot and static pressures is the most commonly used device for providing approximate angle of attack indication in propeller aircraft.

Processor 100 is programmed to calculate the rotation rate necessary to achieve a certain ratio of propeller blade vector tip speed to the speed of sound, where blade vector tip speed is defined as the vector sum of the propeller tip rotational speed and aircraft forward speed. The ratio should be a maximum of approximately 0.8 at maximum horsepower at low altitude to limit noise and loss of efficiency due to compressibility effects, and should be a maximum of approximately 0.85 at maximum horsepower at high altitude where noise is less critical and compressibility effects are less significant due to low air density. (A constant maximum ratio at all altitudes could also be used to simplify calculations.) The ratio is reduced for lower power settings, approximately linearly with output power, down to a minimum ratio of approximately 0.3. When the engine is idling or at very low RPM, it may not be able to produce enough power to produce a tip speed of 0.3 mach, even at completely flat pitch, so the pitch will remain at flat pitch from idle through the rotation rate necessary to attain 0.3 mach. The use of flat pitch at all low engine speeds helps the engine accelerate from low power settings.

Processor 100 is also programmed to limit maximum rotation rate to the maximum safe rotation rate of the engine and/or propeller. This limit overrides all other logic.

The maximum power propeller tip mach number desired is calculated as follows:

$$M_{dmax} = M_{sl} \times (P_o/P)^{0.0314} \quad (5)$$

where:

$M_{dmax}$ is the desired maximum propeller tip mach number at the current altitude.

$M_{sl}$ is the maximum propeller tip mach number at sea level.

$P_o$ is the static pressure at sea level assuming standard conditions

P is the static pressure at the current altitude.

The exponent, 0.0314, is chosen to increase $M_{dslmax}$ the desired amount at high altitude.

A formula similar to formula 5 could be based on temperature instead of pressure, but temperature does not give as good an indication of altitude.

Figure 5:
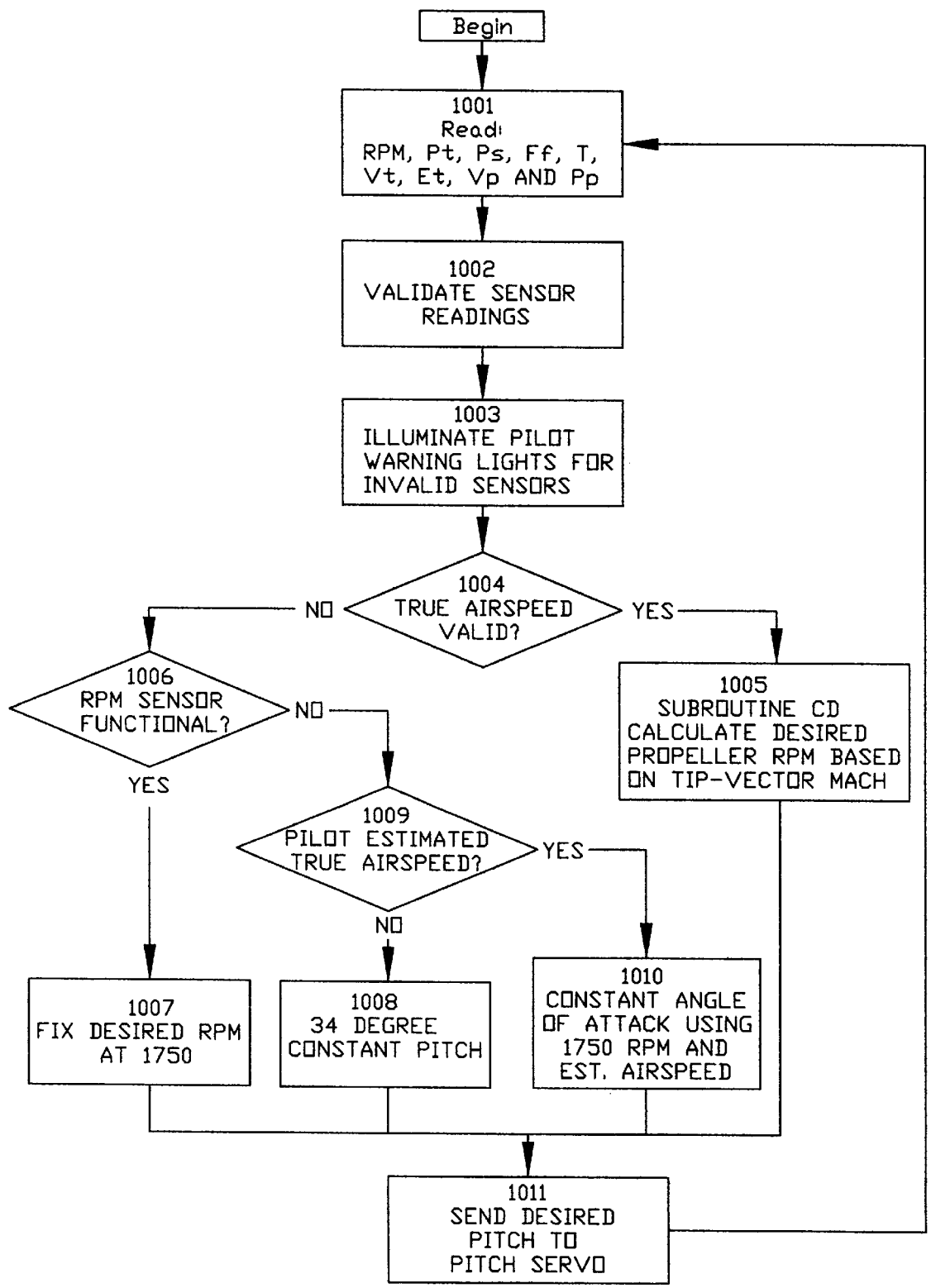
FIG. 5 is a flow chart of the processor routine.

FIG. 5 shows a flow chart of the main routine for processor 100. At Step 1001, ten values are read from analog-to-digital converters for the ten sensors 101–110:

RPM: Rotation rate of propeller or engine
Pt: Pitot Tube Pressure
Ps: Static Port Pressure
Ff: Fuel Flow
T: Temperature
Vt: True Airspeed
Et: Engine Output Torque
Ts: Pilot Throttle Setting
Vp: Pilot Estimated True Airspeed
Pp: Current Propeller Pitch Step 1002 validates the sensor readings to determine which ones are reasonable. If any sensors seem questionable, corresponding pilot warning lights are illuminated in step 1003. For example, temperature is validated by assuring that the reading is in the expected range, including cross-checking with the altitude calculated from static pressure to further narrow the reasonable temperature range. Pitot and static pressures are validated by checking that the pressures are not zero and that pitot pressure is greater than or equal to static pressure. The validity and values from all sensors are stored in memory for use in later logic.

Step 1004 branches according to whether or not airspeed data is valid. Airspeed can be provided either by calculations based on the pitot and static pressure sensors or by the true airspeed sensor. If airspeed is valid, step 1005 calculates a desired propeller rotation rate based on the propeller tip vector mach number. Step 1011 compares the calculated desired rotation rate with the actual current rotation rate and adjusts the pitch to attain the desired rotation rate.

If airspeed sensors are not functioning, step 1006 branches according to whether the rotation rate reading is valid. If rotation rate is valid, step 1007 instructs the propeller controller to maintain a constant rotation rate of 1750 RPM. The purpose of this setting is to prevent the propeller tip vector mach number from getting too high at high airspeeds and altitudes, to prevent the rotation rate from getting too high causing an engine overspeed and also to prevent the rotation rate from getting too low to obtain high power settings.

If the rotation rate sensor is invalid, step 1009 branches according to whether the pilot has set the estimated true airspeed knob. If yes, step 1010 calculates a pitch angle that would result in a 4 degree angle of attack at the ¾ radius (a moderate pitch), assuming the rotation rate is 1750 RPM and the airspeed is as estimated by the pilot. This calculation is very similar to Subroutine CD (FIG. 6), but the rotation rate is assumed and the airspeed is estimated.

If the pilot has not set the estimated true airspeed knob, and airspeed and RPM are invalid, step 1008 instructs the propeller pitch controller to maintain a fixed moderate pitch of 34 degrees at the ¾ radius, which should be high enough to prevent engine overspeed yet low enough to allow the engine to develop substantial power near the ground.

Step 1011 sends a signal indicating the desired pitch to the pitch controller servo 112. If the desired pitch is different than the actual pitch, pitch controller servo 112 adjusts the pitch accordingly.

The program returns to step 1001, forming a continuous loop. The main program continues to loop whenever the aircraft ignition is on. The propeller controller has a backup battery in case the electrical system fails.

Figure 6:
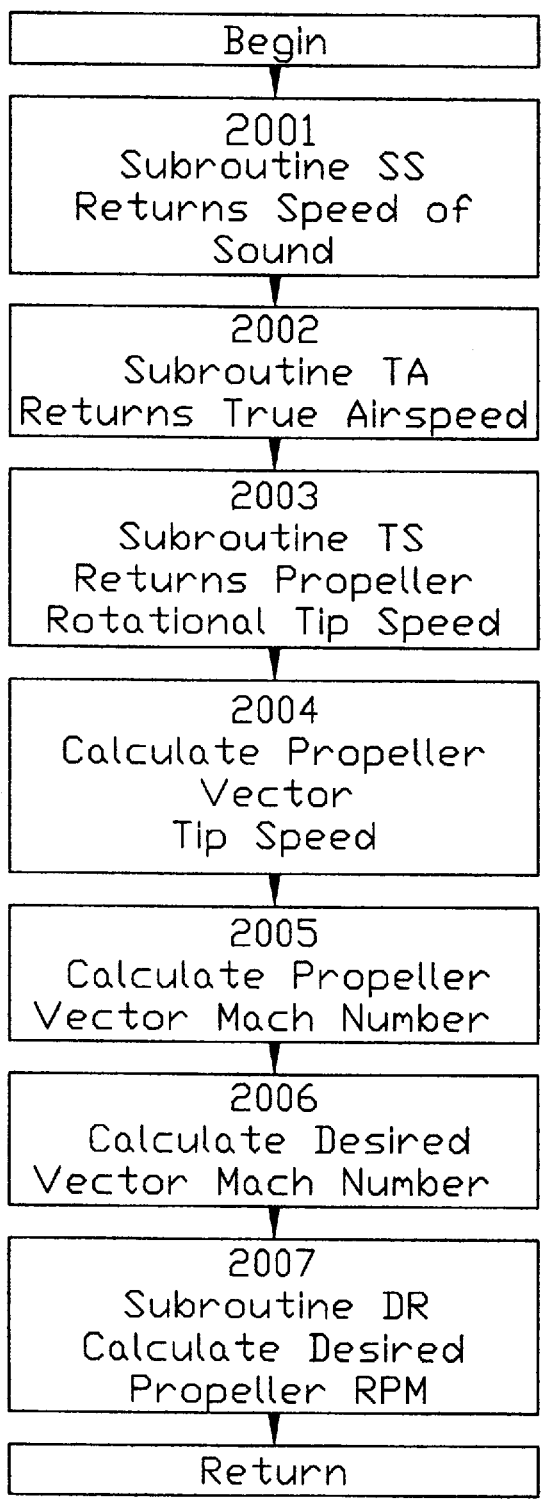
FIG. 6 is a flow chart of the logic used to calculate the desired RPM when valid sensors sets are available.

FIG. 6 shows subroutine CD, which calculates the desired rotation rate based on the propeller tip vector mach number and engine output power.

Step 2001 calls a subroutine SS (FIG. 7) which returns a value for the speed of sound, either calculated or approximated depending on which sensors are functioning. Subroutine SS is described later.

Step 2002 calls a subroutine TA (FIG. 8) that calculates true airspeed, as will be described later. Step 2003 calls a subroutine TS (FIG. 9) to calculate propeller rotational tip speed as will be further described later. Step 2004 calculates the vector tip speed which is the vector sum of the propeller rotational tip speed and the aircraft true airspeed:

$$Pv = \text{SQRT}\,(Ta^2 + Pr^2) \qquad (6)$$

where:

Pv is the propeller vector tip speed

Ta is the aircraft true airspeed

Pr is the propeller rotational tip speed

Step 2005 calculates the propeller tip vector mach number, Pv/Ss, which is the fraction of the speed of sound of the propeller tip through the air, a fraction that governs compressibility effects.

Step 2006 calculates the desired propeller tip vector mach number based on the current output power. The formula for desired mach number is based on the assumption that compressibility effects begin to be pronounced at a mach number of 0.8 at sea level for propellers with moderately swept tips. For highly swept propellers the critical mach number may be greater, while for straight propellers it may be lower. The formula for desired propeller vector tip mach number is of the form:

$$M_d = M_i + (HP/HP_{max})(M_{max} - M_i) \qquad (7)$$

where:

$M_d$ is Mach Number Desired $M_i$ is Mach Number at low power (0.3 in the preferred embodiment)

HP is engine output power $HP_{max}$ is maximum engine output power $M_{max}$ is the maximum mach number desired for the propeller in use. It may also vary with temperature or altitude.

Figure 11:
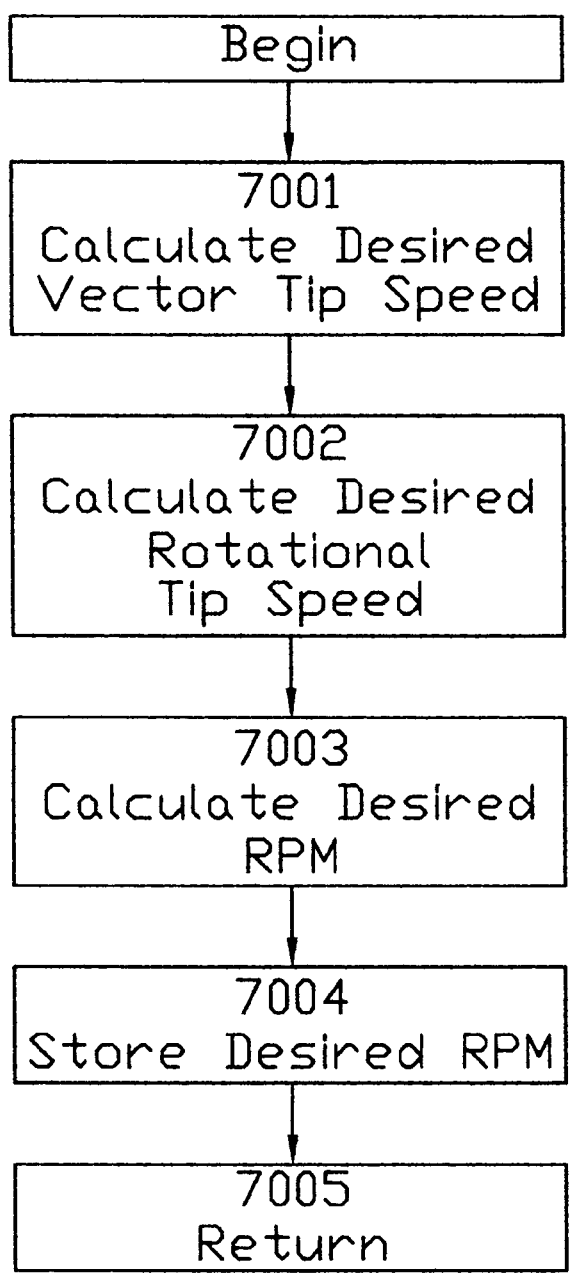
FIG. 11 is a flow chart of the processor subroutine to calculate desired propeller rotation rate.
Figure 12:
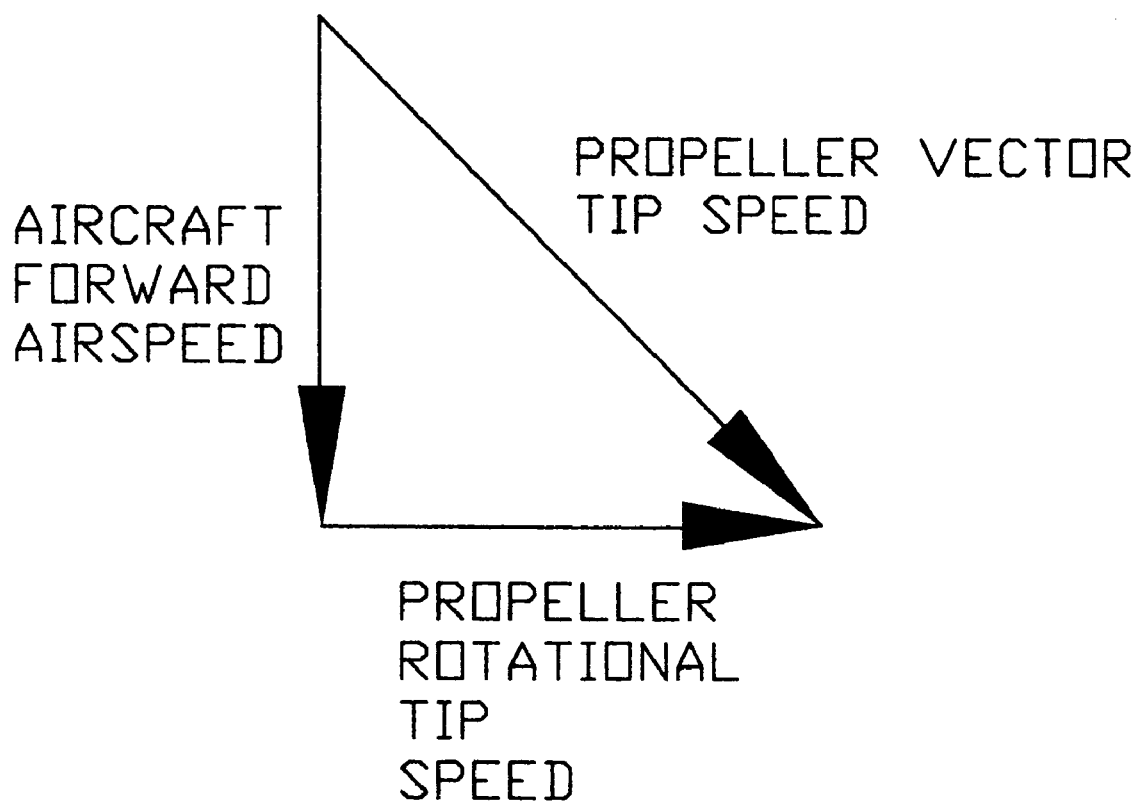
FIG. 12 is a graphical representation of the vector product of the true aircraft forward speed and the speed of the tip of the propeller blade.

Step 2007 calls subroutine DR (FIG. 11), which (as will be further described later) calculates the desired rotation rate based on the desired propeller tip mach number.

Figure 7:
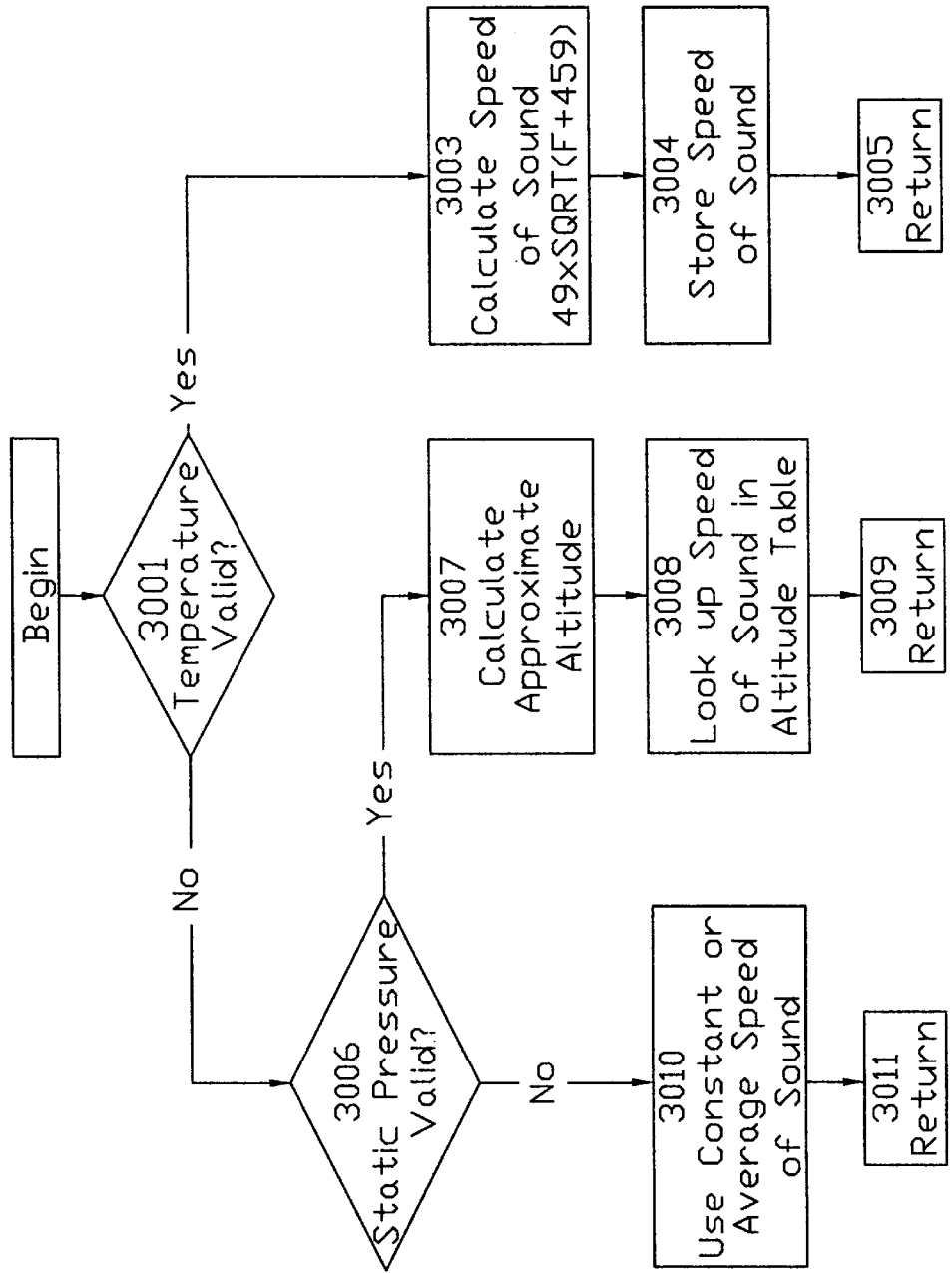
FIG. 7 is a flow chart of the processor subroutine to calculate or estimate the speed of sound in the current conditions.

FIG. 7 shows a flow chart of Subroutine SS, which calculates or estimates the speed of sound. Step 3001 branches according to whether the temperature sensor reading was valid.

If the temperature reading is valid, step 3003 calculates the speed of sound using the formula:

$$Ss = 49 \times \text{SQRT}(F° + 459) \qquad (8)$$

Step 3004 stores the speed of sound for later use, and step 3005 returns. If the temperature reading is invalid, the rest of the routine attempts to estimate the speed of sound based on an approximate altitude calculation. Step 3006 branches according to whether static pressure is valid. If the static pressure reading is valid, step 3007 uses it to calculate an approximate altitude, and step 3008 looks up an approximate speed of sound in a table based on the approximate altitude. Since the speed of sound varies by less than 15 percent between sea level and 45,000 feet, an altitude-based speed of sound lookup is a good alternative to the temperature-based calculation in case the temperature sensor malfunctions.

If both the temperature and static pressure sensors are invalid, step 3010 uses a fixed speed of sound, which could be the sea level speed of sound or a compromise speed of sound for the flight envelope of the aircraft. Steps 3011, 3009, and 3005 return to step 2002.

Figure 8:
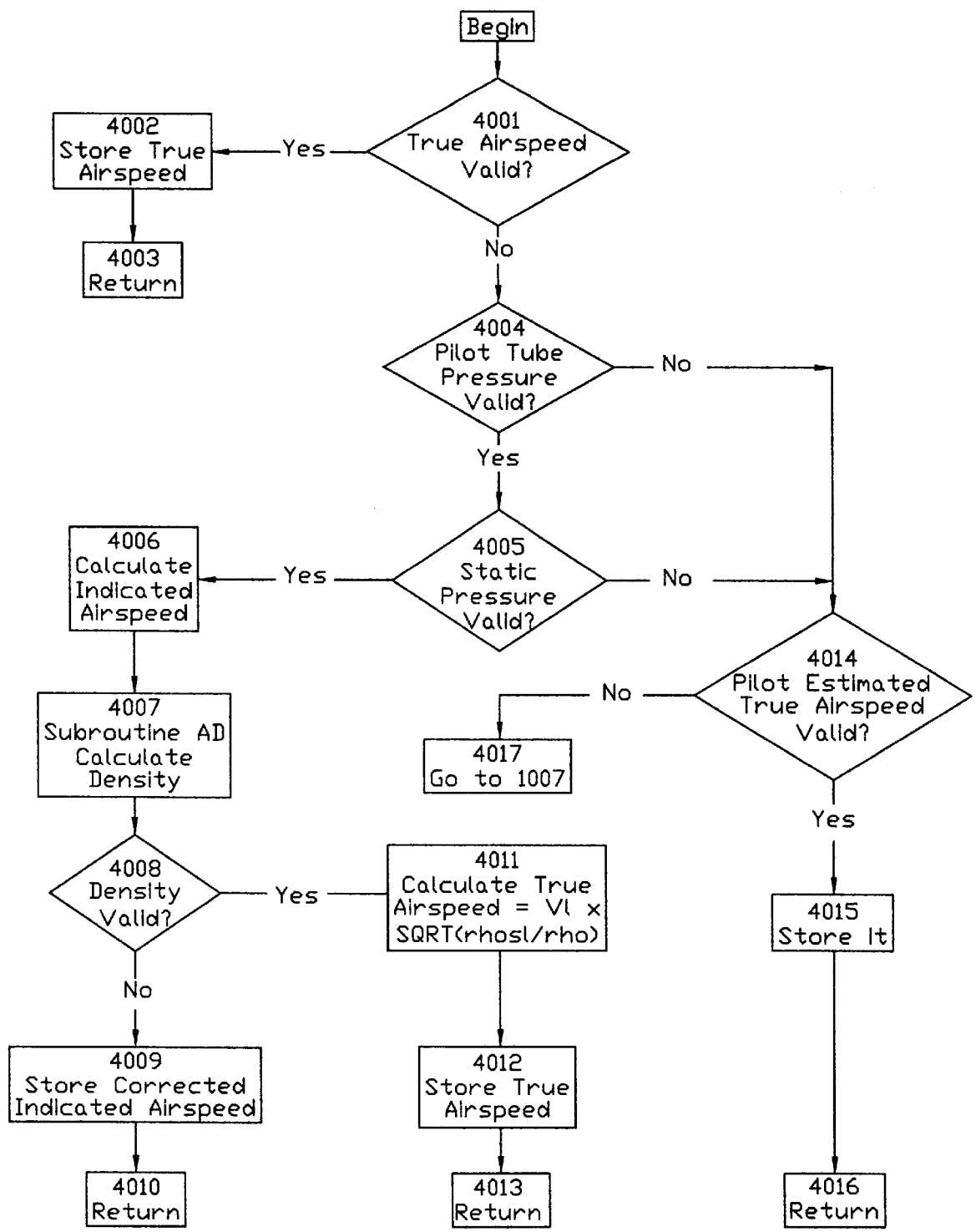
FIG. 8 is a flow chart of the processor subroutine to calculate true airspeed.

FIG. 8 shows the subroutine TA which calculates true airspeed. Step 4001 branches according to whether the true airspeed sensor value is valid. If so, step 4002 stores that value and step 4003 returns. If the true airspeed sensor value is invalid, steps 4004 and 4005 branch according to whether the pitot tube and static pressure readings are valid.

If both pitot and static pressures are valid, step 4006 calculates indicated airspeed based on the difference in pressure between pitot tube and static pressure. Step 4007 calls subroutine AD to calculate or estimate air density (as will be described with FIG. 10), and step 4008 branches according to whether subroutine AD resulted in a valid air density. If the air density is valid, step 4011 calculates true airspeed by the formula:

$$Vt = Vi \times \text{SQRT}(\text{rho}_{sl}/\text{rho}) \qquad (9)$$

where:

Vt is true airspeed.

Vi is indicated airspeed.

$\text{rho}_{sl}$ is air density at sea level.

rho is air density at the current altitude

Step 4012 stores this true airspeed value, and step 4013 returns to step 2003.

If density is invalid, step 4009 stores indicated airspeed corrected to an estimated true airspeed by increasing it approximately 2 percent per thousand feet of altitude. Step 4010 returns to step 2003.

If pitot or static pressure is invalid, step 4014 branches according to whether the pilot set the estimated true airspeed knob. If so, step 4015 stores that value and step 4016 returns to step 2003.

Figure 9:
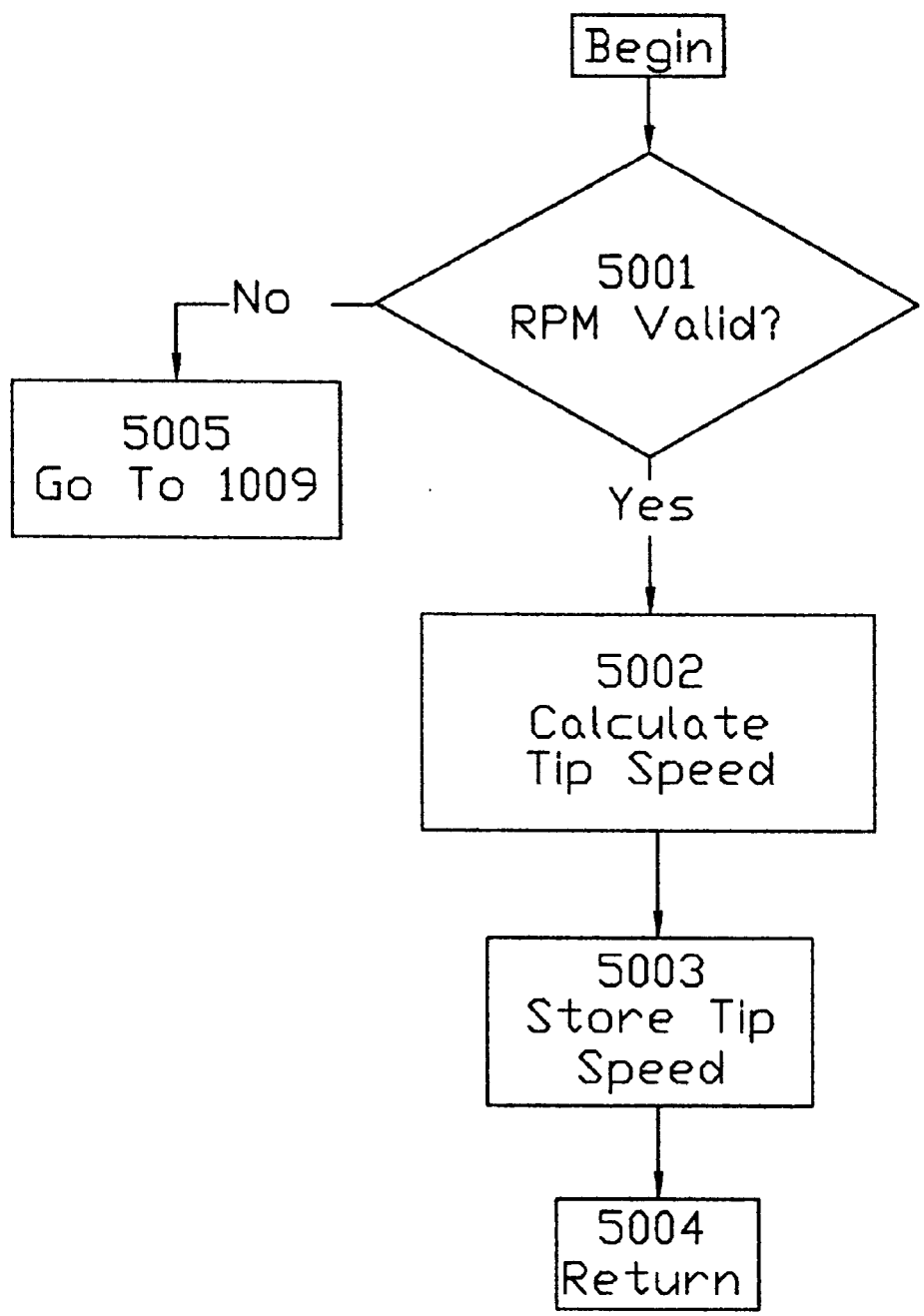
FIG. 9 is a flow chart of the processor subroutine to calculate propeller tip rotational speed.

FIG. 9 shows the flow chart for subroutine TS, which calculates propeller rotational tip speed. Step 5001 branches according to whether the RPM reading is valid. If RPM is valid, step 5002 calculates propeller tip speed using the formula:

$$P_r = \text{RPM} \times 2piR/60 \qquad (10)$$

where:

$P_r$ is propeller tip speed

RPM is the propeller rotational rate in revolutions per minute

R is the propeller radius

Step 5003 stores the calculated tip speed and step 5004 returns to step 2004.

If RPM is invalid, step 5005 goes to step 1009.

Figure 10:
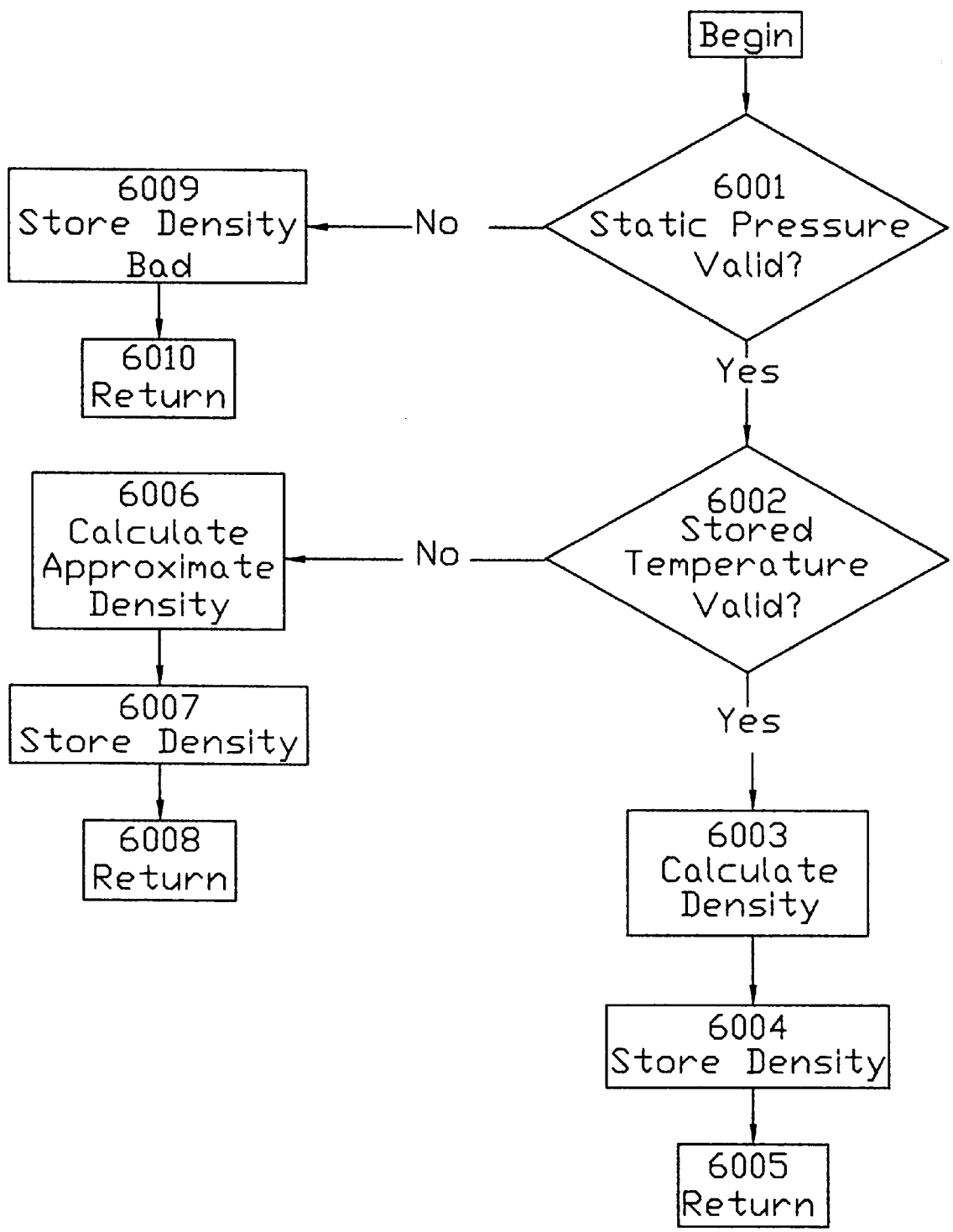
FIG. 10 is a flow chart of the processor subroutine to calculate air density.

The flow chart for subroutine AD, which calculates or estimates air density, is shown in FIG. 10. Step 6001 branches according to whether static pressure is valid. If the static pressure is good, step 6002 branches according to whether or not the temperature reading is valid. If both static pressure and temperature are valid, step 6003 calculates density, step 6004 stores it and step 6005 returns to step 4008.

If static pressure is invalid, density cannot be calculated or estimated, so step 6009 stores that fact for later use, and step 6010 returns to step 4008.

If only temperature is invalid, step 6006 calculates an approximate density by assuming standard temperature for the current altitude, using the formula:

$$rho = C(p)^x \qquad (11)$$

where:

C is a constant with the value 0.8204 p is static pressure x is a constant with the value 0.0001467

Steps 6007 stores the result of the above calculation and step 6008 returns to step 4008 in Subroutine TA.

Subroutine DR (FIG. 11) calculates the desired RPM based on the desired propeller tip vector mach number from 2006 (FIG. 6). Step 7001 calculates the desired vector tip speed by multiplying the desired propeller tip vector mach number by the speed of sound. Step 7002 calculates the desired rotational tip speed, using the formula:

$$P_{rd} = SQRT(P_{dv}^2 - T_a^2) \qquad (12)$$

where:

$P_{dv}$ is desired propeller vector tip speed $P_{rd}$ is desired propeller rotational tip speed $T_a$ is true airspeed.

Step 7003 calculates the desired RPM using the formula:

$$RPM = P_{rd} \times 60/2piR \qquad (13)$$

Step 7004 stores the resulting desired rotation rate and step 7005 returns to step 1011.

The preferred embodiment described above is for a pusher propeller, but the same design would work equally well for a tractor propeller.

The invention is not limited to the preferred embodiment described above; on the contrary the invention extends to any variant that reproduces the above-described essential characteristics by equivalent means.

What is claimed is:

1. An improved propulsion apparatus for use on an aircraft during flight, comprising:
   (a) a propeller;
   (b) a drive system for rotating the propeller;
   (c) a pitch control system mechanically coupled to the propeller for adjusting pitch of the propeller;
   (d) at least one flight attribute sensor carried by the aircraft for monitoring one of the following flight attributes during flight and generating an output signal corresponding thereto:
      (1) drive system output power;
      (2) propeller rotation rate;
      (3) aircraft true forward flight speed; and
      (4) temperature;
   (e) a controller which is communicatively coupled to the flight attribute sensor for:
      (1) receiving the output signal of the flight attribute sensor;
      (2) calculating an optimum propeller rotation rate for current values of the output signal of the flight attribute sensor based upon the ratio of a true resultant propeller tip speed to a speed of sound at a given air temperature;
      (3) supplying at least one control signal to the pitch control system to adjust propeller pitch to obtain the optimum propeller rotation rate.

2. An apparatus according to claim 1, wherein said optimum propeller pitch value is determined from a comparison of propeller blade vector tip speed to the speed of sound.

3. An apparatus according to claim 2, wherein said propeller blade vector tip speed is the vector sum of propeller tip rotational speed and aircraft forward flight speed.

4. An apparatus according to claim 2, wherein said propeller blade vector tip speed is maintained at a preselected fraction of the speed of sound.

5. An apparatus according to claim 4, wherein said optimum propeller pitch value is calculated to maintain said propeller vector tip speed at said preselected fraction of the speed of sound.

6. An apparatus according to claim 4, wherein said optimum propeller pitch value is calculated to maintain said propeller vector tip speed in a preselected range of values which are fractions of the speed of sound for particular flight conditions.

7. An apparatus according to claim 6, wherein said preselected range of values range from approximately 0.3 of the speed of sound to approximately 0.85 of the speed of sound for differing flight conditions.

8. An apparatus according to claim 7, wherein said differing flight conditions comprise aircraft flight altitude from low altitude to high altitude.

9. An apparatus according to claim 7, wherein said differing flight conditions comprise engine output power from low output power to high output power of said drive system.

10. An apparatus according to claim 1, wherein said pitch control system limits pitch adjustment to a range of pitches corresponding to rotation rates identified with maximum safe rotation rates for said drive system and said at least one propeller blade.

11. A method of controlling an aircraft propeller having a tip, comprising the method steps of:
   (a) providing at least one flight attribute sensor in said aircraft;
   (b) providing a controller for receiving data from said at least one flight attribute sensor and for performing calculations;
   (c) utilizing said at least one flight attribute sensor and said controller to calculate forward air speed of said aircraft and aircraft propeller speed;
   (d) utilizing said controller to calculate an optimum aircraft propeller rotation rate based upon true speed of the tip of said aircraft propeller as determined from said aircraft forward air speed and said aircraft propeller speed; and
   (e) adjusting said aircraft propeller to obtain said optimum aircraft propeller rotation rate.

12. A method according to claim 11, wherein said at least one flight attribute sensor comprises:
   (1) at least one of fuel flow rate and engine output torque;
   (2) at least one of engine rotation rate and propeller rotation rate.

13. A method according to claim 12, wherein said at least one flight attribute sensor further comprises:
   (3) at least one sensor for determining forward flight speed.

14. A method according to claim 11, further comprising:

(f) providing at least one environment sensor for monitoring ambient conditions during flight.

15. A method according to claim 14, wherein said at least one environment sensor comprises at least one of the following:

(1) static atmospheric pressure;
(2) aircraft altitude; and
(3) atmospheric temperature.

16. A method according to claim 11, wherein said optimum aircraft propeller rotation rate is based upon true forward airspeed of said aircraft and a rotation tip speed of said aircraft propeller.

17. A method according to claim 11, wherein said optimum aircraft propeller rotation rate is based upon the vector sum of aircraft true forward airspeed and aircraft propeller rotational tip speed.

18. A method according to claim 11, wherein said optimum aircraft propeller rotation rate is a rotation rate required to maintain the vector sum of aircraft true forward airspeed and aircraft propeller rotational tip speed at a preselected fraction of the speed of sound.

19. A method according to claim 11, wherein said optimum aircraft propeller rotation rate is a rotation rate required to maintain a square root of the sum of true forward aircraft speed squared and aircraft propeller rotational tip speed squared at a predetermined magnitude.

20. A method according to claim 19, wherein said predetermined magnitude comprises a preselected range of magnitudes.

21. A method according to claim 19, wherein said predetermined magnitude comprises a selected range fractional magnitudes of the speed of sound.

22. A method according to claim 21, wherein said fraction increases at high altitude.

23. A method according to claim 21, wherein said fraction is approximately 0.8 at maximum engine output power at sea level, and wherein said fraction increases to approximately 0.85 at maximum engine output power at high altitude.

24. A method according to claim 21, wherein said fraction is an approximately linear function of engine output power between a minimum fraction of approximately 0.3 and a maximum fraction of approximately 0.8, and wherein the pitch is set to minimum pitch whenever engine output power is insufficient to attain the minimum fraction.

25. A method according to claim 11, wherein said optimum rotation rate is limited to the lesser of the maximum safe rotation rate of the engine and the maximum safe rotation rate of the propeller.

26. An aircraft propeller pitch controller comprising:

a sensor producing a first electric signal indicative of a quantity selected from the group consisting of fuel flow rate and engine output torque;

a sensor producing a second electric signal indicative of a quantity selected from the group consisting of engine rotation rate and propeller rotation rate;

a sensor producing a third electric signal suggestive of indicated forward flight speed;

a sensor producing a fourth electric signal indicative of a quantity selected from the group consisting of static atmospheric pressure and altitude;

a sensor producing a fifth electric signal indicative of atmospheric temperature;

means responsive to said first, second, third, fourth, and fifth electric signals for calculating an optimum rotation rate such that the vector sum of aircraft true forward airspeed and propeller rotational tip speed is a selected fraction of the speed of sound; and means for controlling a propeller blade pitch such that the rotation rate becomes substantially equal to said optimum rotation rate.

27. An aircraft propeller pitch controller comprising:

a sensor producing a first electric signal indicative of a quantity selected from the group consisting of fuel flow rate and engine output torque;

a sensor producing a second electric signal indicative of a quantity selected from the group consisting of engine rotation rate and propeller rotation rate;

a sensor producing a third electric signal suggestive of true forward flight speed;

a sensor producing a fourth electric signal indicative of atmospheric temperature;

means responsive to said first, second, third, and fourth electric signals for calculating an optimum rotation rate such that the vector sum of aircraft true forward airspeed and propeller rotational tip speed is a selected fraction of the speed of sound; and means for controlling a propeller blade pitch such that the rotation rate becomes substantially equal to said optimum rotation rate.

28. An aircraft propeller pitch controller comprising:

a sensor producing a first electric signal indicative of true forward flight speed;

a sensor producing a second electric signal indicative of a quantity selected from the group consisting of fuel flow rate and engine output torque;

a sensor producing a third electric signal indicative of a quantity selected from the group consisting of engine rotation rate and propeller rotation rate;

means responsive to said first, second, and third electric signals for calculating an optimum rotation rate such that the vector sum of aircraft true forward airspeed and propeller rotational tip speed is a selected fraction of the speed of sound; and means for controlling a propeller blade pitch such that the rotation rate becomes substantially equal to said calculated optimum rotation rate.

29. An aircraft propeller pitch controller as in claim 28, in which the means for controlling propeller blade pitch, in the event the rotation rate sensor fails, sets the pitch based on the current forward true airspeed and an assumed rotation rate, to result in a constant angle of attack at the ¾ radius, where the angle of attack is calculated based on the air approaching on a vector of the propeller rotational tip speed and the aircraft forward true airspeed.

30. An aircraft propeller pitch controller as in claim 28, in which the means for controlling propeller blade pitch, in the event that true airspeed cannot be sensed or calculated, maintains the nearly constant rotation rate necessary to attain a propeller vector tip speed of approximately Mach 0.85 where the propeller vector tip speed is the vector sum of the propeller rotational tip speed and the aircraft design maximum forward true airspeed.

\* \* \* \* \*